US009487128B2

(12) United States Patent
Salter et al.

(10) Patent No.: US 9,487,128 B2
(45) Date of Patent: Nov. 8, 2016

(54) ILLUMINATING RUNNING BOARD

(71) Applicant: Ford Global Technologies, LLC, Dearborn, MI (US)

(72) Inventors: Stuart C. Salter, White Lake, MI (US); Paul Kenneth Dellock, Northville, MI (US); Harry Lobo, Canton, MI (US); Michael Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/862,523

(22) Filed: Sep. 23, 2015

(65) Prior Publication Data

US 2016/0009220 A1 Jan. 14, 2016

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.

| | |
|---|---|
| ***B60Q 1/24*** | (2006.01) |
| ***B60Q 1/32*** | (2006.01) |
| ***F21V 9/16*** | (2006.01) |
| ***B60Q 3/00*** | (2006.01) |
| ***B60Q 3/02*** | (2006.01) |
| ***B60Q 3/06*** | (2006.01) |
| ***H05B 37/02*** | (2006.01) |
| *F21Y 101/02* | (2006.01) |
| *B60Q 1/26* | (2006.01) |

(52) U.S. Cl.

CPC ............... *B60Q 1/323* (2013.01); *B60Q 3/008* (2013.01); *B60Q 3/0216* (2013.01); *B60Q 3/0293* (2013.01); *B60Q 3/06* (2013.01); *F21V 9/16* (2013.01); *H05B 37/0218* (2013.01); *H05B 37/0227* (2013.01); *B60Q 1/26* (2013.01); *F21Y 2101/02* (2013.01); *Y02B 20/46* (2013.01)

(58) Field of Classification Search

CPC .. B60Q 1/323; G09F 13/08; G09F 2013/044
USPC ......................... 362/487, 495, 510–511, 521
See application file for complete search history.

(56) References Cited

U.S. PATENT DOCUMENTS

| | | | |
|---|---|---|---|
| 1,736,616 | A | 11/1929 | Miller |
| 1,738,092 | A | 12/1929 | Bach |
| 4,965,704 | A | 10/1990 | Osborne, Sr. |
| 5,709,453 | A | 1/1998 | Krent et al. |
| 5,915,830 | A | 6/1999 | Dickson et al. |

(Continued)

FOREIGN PATENT DOCUMENTS

| | | | |
|---|---|---|---|
| CN | 101337492 | A | 1/2009 |
| CN | 201169230 | Y | 2/2009 |

(Continued)

*Primary Examiner* — Jason Moon Han

(74) *Attorney, Agent, or Firm* — Jason Rogers; Price Heneveld LLP

(57) ABSTRACT

A running board of a vehicle is provided herein. The running board includes a housing and a light-producing assembly disposed inside the housing. The light-producing assembly includes a plurality of light sources and a photoluminescent structure configured to luminesce in response to excitation by light emitted from the plurality of light sources, wherein luminescent light escapes the housing via a first light permeable portion and a second light permeable portion.

19 Claims, 4 Drawing Sheets

10 III III 14 16 14 12

(56) References Cited

U.S. PATENT DOCUMENTS 6,117,362 A 9/2000 Yen et al.
6,190,027 B1 2/2001 Lekson
6,577,073 B2 6/2003 Shimizu et al.
6,729,738 B2 5/2004 Fuwausa et al.
6,737,964 B2 5/2004 Samman et al.
6,773,129 B2 8/2004 Anderson, Jr. et al.
6,820,888 B1 11/2004 Griffin
6,851,840 B2 2/2005 Ramamurthy et al.
6,859,148 B2 2/2005 Miller
6,871,986 B2 3/2005 Yamanaka et al.
6,953,536 B2 10/2005 Yen et al.
6,990,922 B2 1/2006 Ichikawa et al.
7,161,472 B2 1/2007 Strumolo et al.
7,213,923 B2 5/2007 Liu et al.
7,264,366 B2 9/2007 Hulse
7,264,367 B2 9/2007 Hulse
7,441,914 B2 10/2008 Palmer et al.
7,745,818 B2 6/2010 Sofue et al.
7,753,541 B2 7/2010 Chen et al.
7,834,548 B2 11/2010 Jousse et al.
7,862,220 B2 1/2011 Cannon et al.
7,987,030 B2 7/2011 Flores et al.
8,016,465 B2 9/2011 Egerer et al.
8,022,818 B2 9/2011 la Tendresse et al.
8,071,988 B2 12/2011 Lee et al.
8,097,843 B2 1/2012 Agrawal et al.
8,136,425 B2 3/2012 Bostick
8,163,201 B2 4/2012 Agrawal et al.
8,178,852 B2 5/2012 Kingsley et al.
8,197,105 B2 6/2012 Yang
8,203,260 B2 6/2012 Li et al.
8,207,511 B2 6/2012 Bortz et al.
8,232,533 B2 7/2012 Kingsley et al.
8,247,761 B1 8/2012 Agrawal et al.
8,286,378 B2 10/2012 Martin et al.
8,408,766 B2 4/2013 Wilson et al.
8,415,642 B2 4/2013 Kingsley et al.
8,421,811 B2 4/2013 Odland et al.
8,466,438 B2 6/2013 Lambert et al.
8,519,359 B2 8/2013 Kingsley et al.
8,519,362 B2 8/2013 Labrot et al.
8,552,848 B2 10/2013 Rao et al.
8,606,430 B2 12/2013 Seder et al.
8,624,716 B2 1/2014 Englander
8,631,598 B2 1/2014 Li et al.
8,664,624 B2 3/2014 Kingsley et al.
8,683,722 B1 4/2014 Cowan
8,724,054 B2 5/2014 Jones
8,773,012 B2 7/2014 Ryu et al.
8,846,184 B2 9/2014 Agrawal et al.
8,952,341 B2 2/2015 Kingsley et al.
9,057,021 B2 6/2015 Kingsley et al.
9,065,447 B2 6/2015 Buttolo et al.
9,299,887 B2 3/2016 Lowenthal et al.
2002/0159741 A1 10/2002 Graves et al.
2002/0163792 A1 11/2002 Formoso
2003/0179548 A1 9/2003 Becker et al.
2004/0213088 A1 10/2004 Fuwausa
2005/0036327 A1 2/2005 Patel
2006/0087826 A1 4/2006 Anderson, Jr.
2007/0032319 A1 2/2007 Tufte
2007/0285938 A1 12/2007 Palmer et al.
2009/0219730 A1 9/2009 Syfert et al.
2009/0251920 A1* 10/2009 Kino ..................... B60Q 1/323
362/602
2009/0262515 A1 10/2009 Lee et al.
2011/0012062 A1 1/2011 Agrawal et al.
2012/0001406 A1 1/2012 Paxton et al.
2012/0092889 A1 4/2012 Held et al.
2012/0104954 A1 5/2012 Huang
2012/0183677 A1 7/2012 Agrawal et al.
2012/0280528 A1 11/2012 Dellock et al.
2013/0026504 A1 1/2013 Marx et al.
2013/0335994 A1 12/2013 Mulder et al.
2014/0065442 A1 3/2014 Kingsley et al.
2014/0103258 A1 4/2014 Agrawal et al.
2014/0264396 A1 9/2014 Lowenthal et al.
2014/0266666 A1 9/2014 Habibi
2014/0373898 A1 12/2014 Rogers et al.
2015/0046027 A1 2/2015 Sura et al.
2015/0138789 A1 5/2015 Singer et al.
2015/0267881 A1 9/2015 Salter et al.
2016/0016506 A1 1/2016 Collins et al.

FOREIGN PATENT DOCUMENTS

CN 201193011 Y 2/2009
DE 29708699 U1 7/1997
DE 10319396 A1 11/2004
EP 1793261 A1 6/2007
EP 2778209 A1 9/2014
JP 2000159011 A 6/2000
JP 2007238063 A 9/2007
WO 2006047306 A1 5/2006
WO 2014068440 A1 5/2014

* cited by examiner

ILLUMINATING RUNNING BOARD

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a running board of a vehicle is provided. The running board includes a housing and a light-producing assembly disposed inside the housing. The light-producing assembly includes a plurality of light sources and a photoluminescent structure configured to luminesce in response to excitation by light emitted from the plurality of light sources, wherein luminescent light escapes the housing via a first light permeable portion and a second light permeable portion.

According to another aspect of the present invention, a running board of a vehicle is provided. The running board includes a housing defining an edge of the running board. A light-producing assembly is disposed inside the housing and includes a plurality of light sources and a photoluminescent structure configured to luminesce in response to excitation by light emitted from the plurality of light sources. Luminescent light escapes the housing via a light permeable side portion and a light permeable bottom portion.

According to yet another aspect of the present invention, a running board of a vehicle is provided. The running board includes a housing and a light-producing assembly disposed inside the housing. The light-producing assembly includes a plurality of light sources and a photoluminescent structure configured to luminesce in response to excitation by light emitted from the plurality of light sources. Luminescent light escapes the housing via a light permeable side portion and a light permeable bottom portion that are separated by a light blocking portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to a running board of a vehicle. Typically, running boards, also known as footboards, are found on higher vehicles such as trucks and sport utility vehicles and are used to assist passengers in entering and exiting the vehicle. The running board disclosed herein is operable as an ambient light and a puddle lamp. According to one embodiment described herein, the running board may illuminate by luminescence and benefits from a cost effective design when compared to more traditional approaches using components such as expensive light emitting diodes (LEDs), light pipes, and fiber optics.

Figure 1:
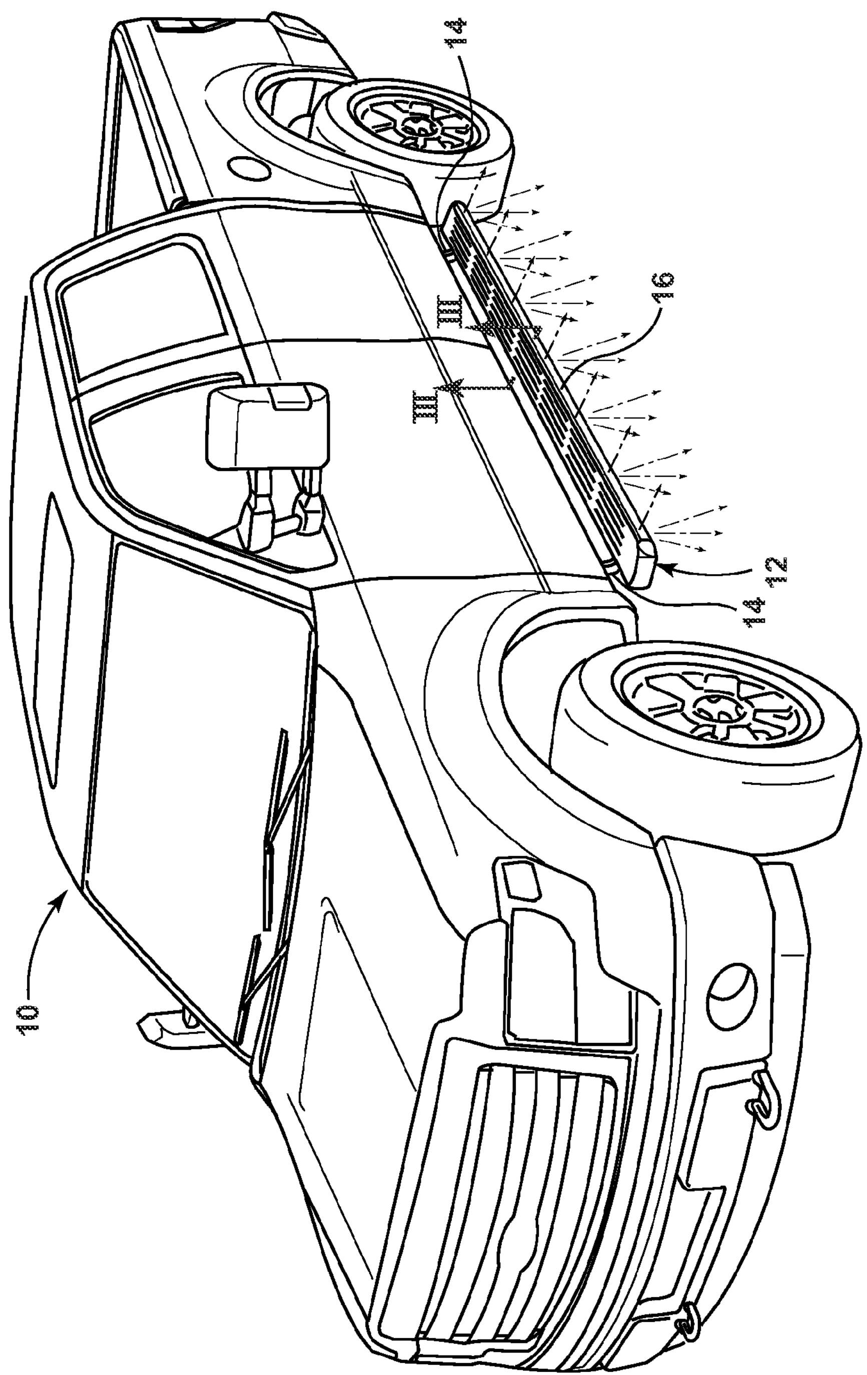
FIG. 1 illustrates a vehicle equipped with an illuminating running board, according to one embodiment.

Referring to FIG. 1, a vehicle 10 is generally shown having a running board 12 that extends along the side of the vehicle 10. The running board 12 is secured to the vehicle 10 via a pair of mounting brackets 14 and may be fixed or is otherwise movable between a use position and a stowed position. As shown, the running board 12 includes a side portion 16 that may extend the length of the running board 12. Side portion 16 may be configured as a strip and illuminates to provide ambient light, thereby imparting a luxurious appearance to the vehicle 10.

Figure 2:
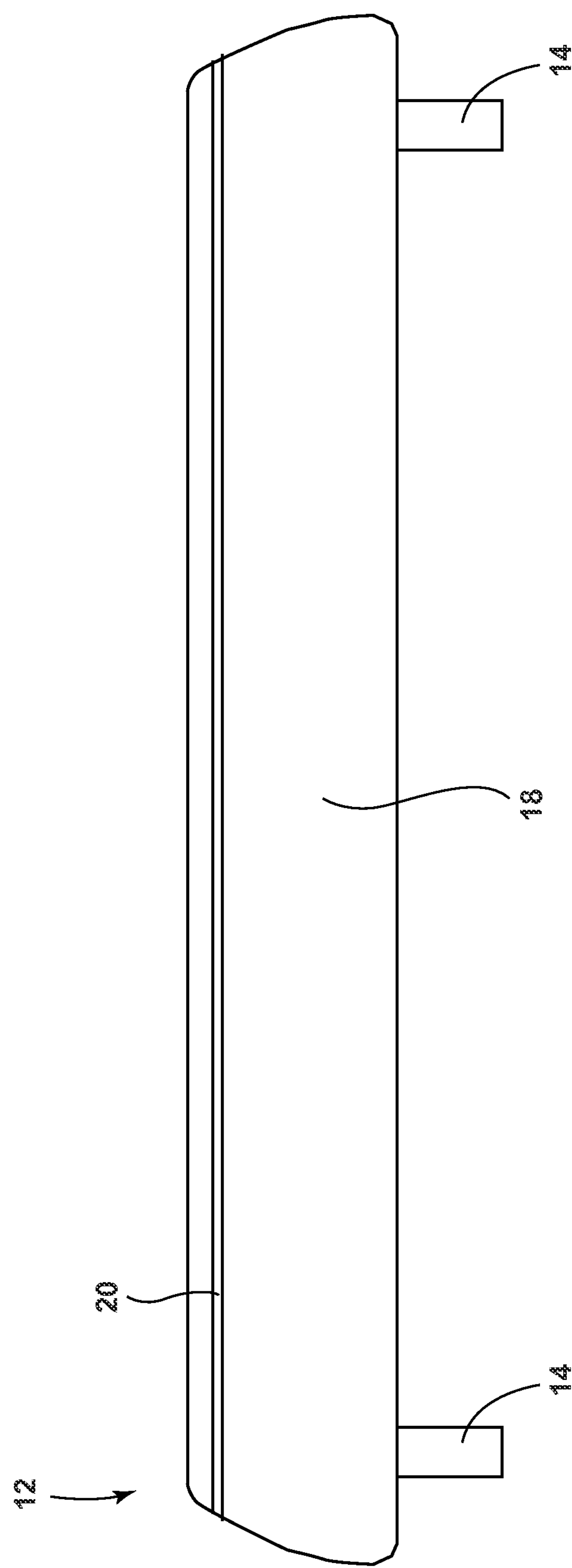
FIG. 2 is a bottom view of a running board, according to one embodiment.

Referring to FIG. 2, an underside 18 of the running board 12 is shown according to one embodiment. As shown, the running board 12 includes a bottom portion 20, which may be configured as a strip extending the length of the running board 12. The bottom portion 20 may function as a puddle lamp to illuminate a ground area near vehicle 10.

Figure 3:
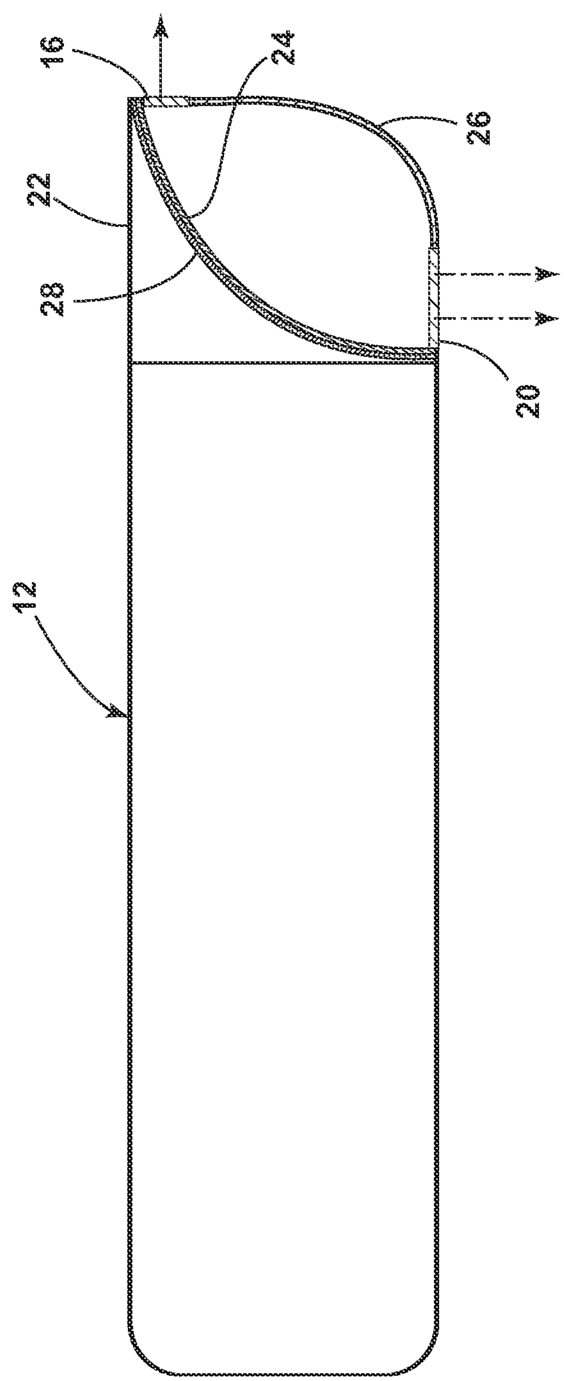
FIG. 3 is a cross-sectional view of a running board taken along line in FIG. 1, according to one embodiment.

Referring to FIG. 3, a cross-sectional view of the running board 12 is shown according to one embodiment. As shown, side portion 16 and bottom portion 20 are part of a housing 22 that defines a distal end of the running board 12 when in the use position depicted previously in FIG. 1. The housing 22 may be co-extruded from plastic such as polycarbonate, which generally imparts good impact resistance and optical clarity. Side portion 16 and bottom portion 20 are each light permeable to allow light from a light-producing assembly 24 to escape the housing 22 and are separated by a light blocking portion 26 disposed therebetween. The light-producing assembly 24 is disposed on a curved mounting surface 28 and may extend the length of the running board 12. Alternatively, the mounting surface 28 may be linear if desired. In some embodiments, the light blocking portion 26 may be configured to internally reflect propagating light originating from the light-producing assembly 24 and/or have a metallic appearance. For example, the outer surfaces of the light blocking portion 26 may be covered with a painted metal whereas the inner surfaces of the light blocking portion 26 may be covered by a reflective material. The remaining inner surfaces of the housing 22 may also be configured to internally reflect light to help direct light from the light-producing assembly 24 through the side and bottom portions 16, 20 and the remaining outer surfaces of the housing 22 may also be configured to have a metallic appearance.

Figure 4:
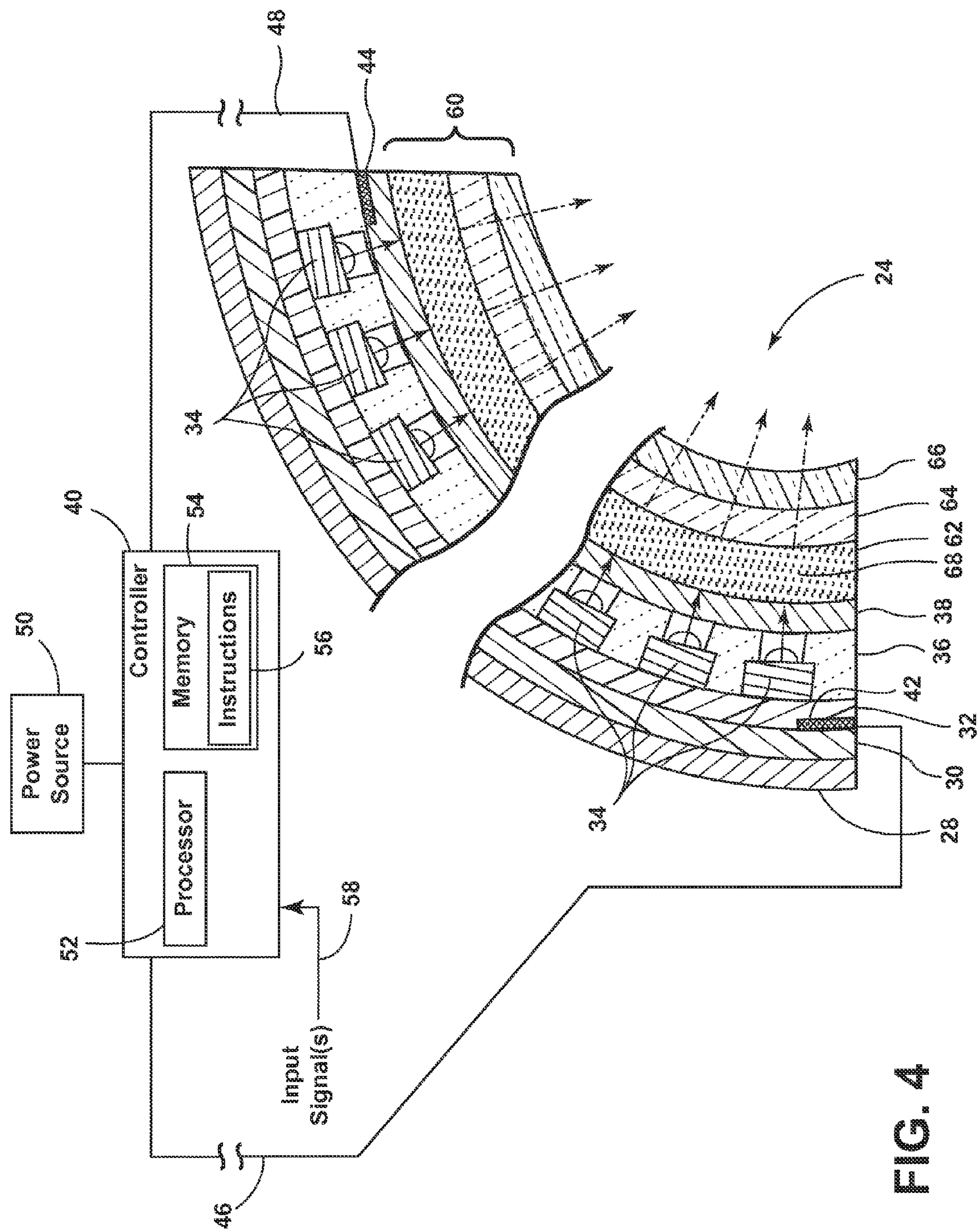
FIG. 4 is an enlarged view of the light-producing assembly shown in FIG. 3, according to one embodiment.

Referring to FIG. 4, an enlarged view of the light-producing assembly 24 depicted in FIG. 3 is shown according to one embodiment. The light-producing assembly 24 includes a substrate 30 coupled to the mounting surface 28. The substrate 30 may include a polycarbonate, poly-methyl methacrylate (PMMA), or polyethylene terephthalate (PET) material on the order of 0.005 to 0.060 inches thick. A positive electrode 32 is arranged over the substrate 30 and includes a conductive epoxy such as, but not limited to, a silver-containing or copper-containing epoxy. The positive electrode is 32 electrically connected to a plurality of light sources, shown as LEDs 34, which are arranged within a semiconductor ink 36 and applied over the positive electrode 32. A negative electrode 38 is also electrically connected to the LEDs 34 and is arranged over the semiconductor ink 36. The negative electrode 38 includes a transparent or translucent conductive material such as, but not limited to, indium tin oxide. In alternative embodiments, the positive and negative electrodes 32, 38 may trade positions within the light-producing assembly 24, in which case the positive electrode 32 should include a transparent or translucent conductive material to allow light emitted from the LEDs 34 to be transmitted therethrough.

The positive and negative electrodes 32, 38 are each electrically connected to a controller 40 via a corresponding bus bar 42, 44 and a corresponding conductive lead 46, 48. The bus bars 42, 44 may be printed along opposite edges of the positive and negative electrodes 32, 38 and the points of connection between the bus bars 42, 44 and the conductive leads 46, 48 may be at opposite corners of each bus bar 42, 44 to promote uniform current distribution along the bus bars 42, 44. The controller 40 may be variously located in the vehicle 10 and the conductive leads 46, 48 may be wired through the running board 12 and the mounting brackets 14. The controller 40 is also electrically connected to a power source 50, which may correspond to a vehicular power source operating at 12 to 16 VDC.

The controller 40 may include a processor 52 and a memory 54 that stores instructions 56 that are executed by the processor 52. The instructions enable the controller 40 to selectively control the LEDs 34 based on one or more input signals 58, which may be received from vehicle equipment, user-operated switches, and the like. In one embodiment, the input signals 58 may include a vehicle-related condition such as, but not limited to, an operational state of the vehicle, a status related to a particular vehicle equipment (e.g., door open status), a key fob proximity status, a remote signal sourced from a portable electronic device, a status related to an operating environment of the vehicle (e.g., an ambient light level), or any other information or control signal that may be utilized to activate or otherwise adjust the output of the LEDs 34.

The LEDs 34 may be dispersed in a random or controlled fashion within the semiconductor ink 36. The LEDs 34 may correspond to micro-LEDs of gallium nitride elements on the order of 5 to 400 microns in size and the semiconductor ink 36 may include various binders and dielectric material including, but not limited to, one or more of gallium, indium, silicon carbide, phosphorous, and/or translucent polymeric binders. In some embodiments, the LEDs 34 and semiconductor ink 36 may be sourced from Nth Degree Technologies Worldwide Inc. The semiconductor ink 36 can be applied through various printing processes, including ink jet and silk screen processes to selected portion(s) of the positive electrode 32. More specifically, it is envisioned that the LEDs 34 are dispersed within the semiconductor ink 36, and shaped and sized such that a substantial quantity of them align with the positive electrode 32 and the negative electrode 38 during deposition of the semiconductor ink 36.

Referring still to FIG. 4, a photoluminescent structure 60 is arranged over the negative electrode 38. The photoluminescent structure 60 may be arranged as a coating, layer, film or other suitable deposition. With respect to the presently illustrated embodiment, the photoluminescent structure 60 may be arranged as a multi-layered structure including an energy conversion layer 62, an optional stability layer 64, and an optional protection layer 66. The energy conversion layer 62 includes at least one photoluminescent material 68 having energy converting elements with phosphorescent or fluorescent properties. For example, the photoluminescent material 68 may include organic or inorganic fluorescent dyes including rylenes, xanthenes, porphyrins, phthalocyanines. Additionally or alternatively, the photoluminescent material 68 may include phosphors from the group of Ce-doped garnets such as YAG:Ce. The energy conversion layer 62 may be prepared by dispersing the photoluminescent material 68 in a polymer matrix to form a homogenous mixture using a variety of methods. Such methods may include preparing the energy conversion layer 62 from a formulation in a liquid carrier medium and coating the energy conversion layer 62 to the negative electrode 38. The energy conversion layer 62 may be applied to the negative electrode 38 by painting, screen printing, flexography, spraying, slot coating, dip coating, roller coating, and bar coating. Alternatively, the energy conversion layer 62 may be prepared by methods that do not use a liquid carrier medium. For example, the energy conversion layer 62 may be rendered by dispersing the photoluminescent material 68 into a solid state solution (homogenous mixture in a dry state) that may be incorporated in a polymer matrix formed by extrusion, injection, compression, calendaring, thermoforming, etc.

To protect the photoluminescent material 68 contained within the energy conversion layer 62 from photolytic and thermal degradation, the photoluminescent structure 60 may optionally include a stability layer 64, which may be configured as a separate layer optically coupled and adhered to the energy conversion layer 62 or otherwise integrated therewith. Each photoluminescent structure 60 may also optionally include a protection layer 66 optically coupled and adhered to the stability layer 64 or other layer to protect the photoluminescent structure 60 from physical and chemical damage arising from environmental exposure. The stability layer 64 and/or the protection layer 66 may be combined with the corresponding energy conversion layer 62 through sequential coating or printing of each layer, sequential lamination or embossing, or any other suitable means.

Additional information regarding photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. Also, additional information regarding printed LED arrangements is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

In operation, the photoluminescent structure 60 is configured to luminesce in response to excitation by light emitted by the LEDs 34. More specifically, light emitted from the LEDs 34 undergoes an energy conversion process and is converted by the photoluminescent material 68 and re-emitted therefrom at a different wavelength. Light emitted by the LEDs 34 is referred to herein as inputted light and is demonstrated in FIG. 4 by solid arrows, whereas light re-emitted from the photoluminescent material 68 is referred to herein as converted light or luminescent light and is demonstrated in FIG. 4 by broken arrows. According to one embodiment, the photoluminescent material 68 may be formulated to convert inputted light into a longer wavelength light, otherwise known as down conversion. Alternatively, the photoluminescent material 68 may be formulated to convert inputted light into a shorter wavelength light, otherwise known as up conversion. Under either approach, light converted by the photoluminescent material 68 may be subsequently outputted from the corresponding photoluminescent structure 60 or otherwise used in an energy cascade, wherein the converted light serves as inputted light to excite another formulation of photoluminescent material located within the energy conversion layer 62, whereby the subsequent converted light may then be outputted from the photoluminescent structure 60 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

According to one embodiment, the photoluminescent material 68 is formulated to have a Stokes shift resulting in the converted light having an emission spectrum expressed in a desired color. In one embodiment, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 34, which may offer a relative cost advantage over other colors of LEDs or simply using LEDs of the desired color and omitting the photoluminescent structure 60 altogether.

In alternative embodiments, the energy conversion layer 62 may include more than one distinct photoluminescent material, each of which is configured to convert inputted light into a longer or shorter wavelength light. In one embodiment, the distinct photoluminescent materials may be interspersed within the energy conversion layer 62. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 34, which may be variously arranged. In some embodiments, each distinct photoluminescent material may be formulated to have a Stokes shift resulting in the associated converted light having an emission spectrum expressed in a unique color such that the resultant luminescence corresponds to a light mixture of the converted light from each distinct photoluminescent material. By mixing the converted light outputted from two or more distinct photoluminescent materials, a greater diversity of colors may be expressed that might otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which is incorporated herein by reference.

In operation, the controller 40 may selectively control the intensity of the LEDs 34 to ultimately affect the brightness of the luminescent light outputted from the side and bottom portions 16, 20 of the running board 12. For example, increasing the intensity of the LEDs 34 generally results in the side and bottom portions 16, 20 exhibiting a brighter luminescence. The controller 40 may control the intensity of the LEDs 34 through pulse-width modulation or direct current control. Additionally or alternatively, the controller 40 may control the light emission duration of the LEDs 34 to affect the duration in which the side and bottom portions 16, 20 luminesce. For example, the controller 40 may activate the LEDs 34 for an extended duration such that the side and bottom portions 16, 20 exhibit sustained luminescence. Alternatively, the controller 40 may flash the LEDs 34 at varying time intervals such that the side and bottom portions 16, 20 exhibit a blinking effect.

Accordingly, a running board 12 of a vehicle 10 has been advantageously provided herein. The running board 12 is configured to illuminate by luminescence and operable to function as an ambient light and a puddle lamp.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A running board of a vehicle, comprising:
a housing;
a light-producing assembly disposed inside the housing and comprising:
a light source; and
a photoluminescent structure configured to luminesce in response to excitation by light emitted from the light source, wherein luminescent light escapes the housing via a first light permeable portion and a second light permeable portion, wherein the first light permeable portion comprises a bottom portion of the housing and the second light permeable portion comprises a side portion of the housing, wherein light escaping the housing via the bottom portion illuminates a ground area near the vehicle, and wherein light escaping the housing via the side portion provides ambient light.

2. The running board of claim 1, wherein the housing defines an edge of the running board.

3. The running board of claim 1, wherein the light-producing assembly is arranged over one of a curved surface and a linear surface.

4. The running board of claim 1, wherein the light source comprise a printed LED arrangement.

5. The running board of claim 1, wherein the housing further comprises a light blocking portion disposed between the first and second light permeable portions.

6. The running board of claim 5, wherein the light blocking portion is configured to internally reflect light inside the housing.

7. The running board of claim 6, wherein the first light permeable portion, the second light permeable portion, and the light blocking portion each extend the length of the running board.

8. A running board of a vehicle, comprising:
a housing defining an edge of the running board;
a light-producing assembly disposed inside the housing and comprising:
a light source; and
a photoluminescent structure configured to luminesce in response to excitation by light emitted from the light source, wherein luminescent light escapes the housing via a light permeable side portion and a separately disposed light permeable bottom portion to illuminate a ground area near the vehicle.

9. The running board of claim 8, wherein the light-producing assembly is arranged over one of a curved surface and a linear surface.

10. The running board of claim 8, wherein the light source comprises a printed LED arrangement.

11. The running board of claim 8, wherein the housing further comprises a light blocking portion disposed between the side portion and the bottom portion.

12. The running board of claim 8, wherein luminescent light also escapes the housing via the light permeable side portion to provide ambient light.

13. The running board of claim 8, wherein portions of the housing are configured to at least one of internally reflect light and have an outward metallic appearance.

14. A running board of a vehicle, comprising:
a housing;
a light-producing assembly disposed inside the housing and comprising:
a light source; and
a photoluminescent structure configured to luminesce in response to excitation by light emitted from the light source, wherein luminescent light escapes the housing via a light permeable side portion to provide ambient light and via a light permeable bottom portion to illuminate a ground area near the vehicle, wherein the light permeable side portion and the light permeable bottom portion are separated by a light blocking portion.

15. The running board of claim 14, wherein the housing defines an edge of the running board.

16. The running board of claim 14, wherein the light-producing assembly is arranged over one of a curved surface and a linear surface.

17. The running board of claim 14, wherein the light source comprises a printed LED arrangement.

18. The running board of claim 14, wherein portions of the housing are configured to internally reflect light propagating inside the housing.

19. The running board of claim 14, wherein portions of the housing are configured to have a metallic appearance.

* * * * *